UNITED STATES PATENT OFFICE.

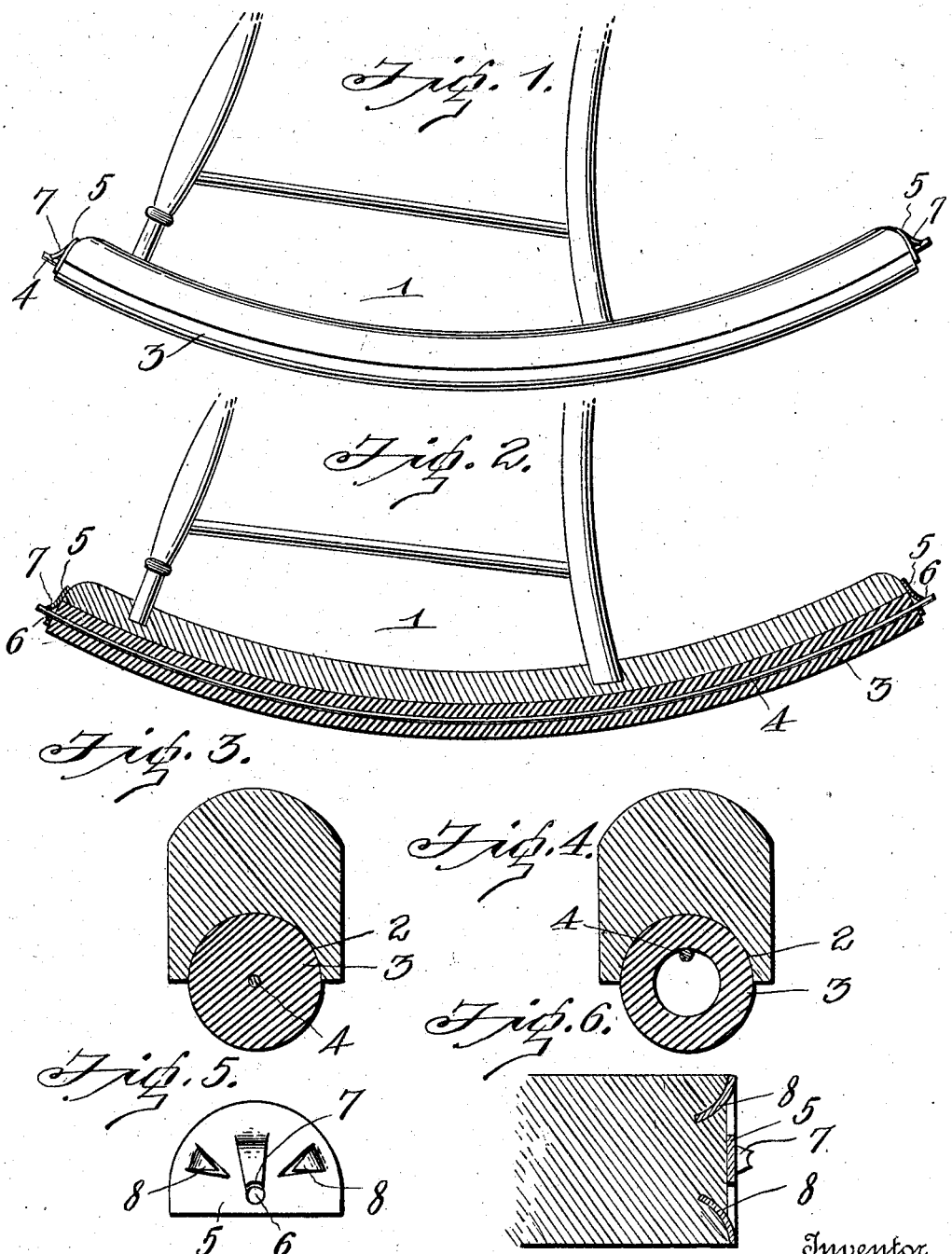

PHILIP J. GEYLER, OF HILLSBORO, OHIO.

ROCKER ATTACHMENT.

No. 816,088.   Specification of Letters Patent.   Patented March 27, 1906.

Application filed June 19, 1905. Serial No. 265,961.

*To all whom it may concern:*

Be it known that I, PHILIP J. GEYLER, a citizen of the United States, residing at Hillsboro, in the county of Highland and State of Ohio, have invented certain new and useful Improvements in Rocker Attachments; and I do declare the following to be a full, clear, and exact description of the invention, such as will enable others skilled in the art to which it appertains to make and use the same.

This invention relates to attachments for rockers.

The object of the invention is to provide a resilient tread or tire for rockers of chairs, hobby-horses, and the like whereby the jarring or shaking which would be occasioned by rocking over uneven surfaces will be compensated for and will not be felt by the occupant of the chair or other article to which the tires are attached, the resilient or elastic tread or tire also preventing the chair or other article from creeping or shifting across the floor while being rocked.

A further object is to provide a simple and efficient means for securely fastening the resilient tread or tire to the rocker.

With these and other objects in view the invention consists of certain novel features of construction, combination, and arrangement of parts, as will be hereinafter described and claimed.

In the accompanying drawings, Figure 1 is a side elevation of the lower ends of the legs of a rocking-chair, showing the application of the invention to the rocker of the same. Fig. 2 is a vertical longitudinal sectional view thereof. Fig. 3 is a vertical transverse sectional view of the same, showing one form of tire or tread. Fig. 4 is a similar view showing another form of the same. Fig. 5 is an enlarged elevation of one of the metal securing-caps; and Fig. 6 is a detail sectional view through one end of the rocker, showing the manner in which said caps are attached thereto.

Referring more particularly to the drawings, 1 denotes the rocker, in the lower side or tread of which is formed a longitudinally-disposed tube or channel 2, extending throughout the length of the same. In the channel 2 is arranged an elastic or resilient tread or tire 3, said tire being solid, as shown in Figs. 2 and 3, or in hollow cushion form, as shown in Fig. 4. The tires or treads 3 may be cemented in the groove or channel 2; but in order that the same may be more securely held therein a retaining-wire 4 is provided, said wire being inserted through the treads or tires, as shown in Fig. 2. The ends of the wire are secured in metallic caps or plates 5, which are arranged on and secured to the opposite ends of the rocker. The plates 5 are preferably substantially semicircular in shape, and in the same are formed apertures 6, through which the ends of the wire 4 project. Above the hole 6 the plates are slitted to form spring-tongues 7, adapted to engage the ends of the wire to securely hold or retain the same in place. In the plates are also formed V-shaped prongs or teeth 8, which are adapted to be forced into the ends of the rocker, thereby securely holding the caps or plates 5 in place without the use of nails or screws.

By providing the rockers of chairs or other articles with treads or tires constructed and secured as herein shown and described all jars or concussions will be taken from the chair, thus making the same easy and comfortable for use.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A resilient tread for rockers comprising a cushion-tire, a securing-wire inserted through said tire, apertured metallic cap-plates to secure the ends of said wire to the ends of the rocker, said cap-plates having spring-tongues to grip the ends of the wire when inserted through the apertures therein, and prongs or barbs struck out from said cap-plates to engage the ends of the rocker to hold the cap-plates in place thereon, substantially as described.

2. A rocker having a longitudinally-disposed groove formed on its under side from end to end, a cushion tread or tire arranged in said groove, a securing-wire inserted through said tire, apertured metallic cap-plates to secure the ends of said wire, to the ends of the rocker, said cap-plates having spring-tongues to grip the ends of the wire when inserted through the apertures therein, and prongs or barbs struck out from said cap-plates to engage the ends of the rocker to hold the cap-plates in place thereon, substantially as described.

In testimony whereof I have hereunto set my hand in presence of two subscribing witnesses.

PHILIP J. GEYLER.

Witnesses:
IRVIN McD. SMITH,
NELLIE S. JOLLY.